United States Patent
Mosendz et al.

(10) Patent No.: US 8,623,670 B1
(45) Date of Patent: Jan. 7, 2014

(54) METHOD FOR MAKING A PERPENDICULAR THERMALLY-ASSISTED RECORDING (TAR) MAGNETIC RECORDING DISK HAVING A CARBON SEGREGANT

(75) Inventors: Oleksandr Mosendz, San Jose, CA (US); Simone Pisana, San Jose, CA (US); James William Reiner, Palo Alto, CA (US); Franck Dreyfus Rose, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/549,500

(22) Filed: Jul. 15, 2012

(51) Int. Cl.
*H01L 21/00* (2006.01)
*H01L 21/302* (2006.01)

(52) U.S. Cl.
USPC ................ 438/3; 438/689; 438/720

(58) Field of Classification Search
None
See application file for complete search history.

(56) References Cited

U.S. PATENT DOCUMENTS

| 2004/0131795 | A1* | 7/2004 | Kuo et al. | 427/571 |
| 2008/0268288 | A1* | 10/2008 | Jin | 428/800 |
| 2011/0151278 | A1 | 6/2011 | Gurney et al. | |
| 2011/0205862 | A1 | 8/2011 | Kanbe et al. | |

OTHER PUBLICATIONS

Zhang et al. "L10-ordered high coercivity (FePt)Ag—C granular thin films for perpendicular recording", Journal of Magnetism and Magnetic Materials, vol. 322, Issue 18, Sep. 2010, pp. 2658-2664.

* cited by examiner

*Primary Examiner* — Duy Deo
(74) *Attorney, Agent, or Firm* — Thomas R. Berthold

(57) ABSTRACT

A method of making a thermally-assisted recording (TAR) disk includes etching an initial layer of generally spherically shaped FePt grains encapsulated by shells of graphitic carbon layers. The etching partially or completely removes the carbon layers on the tops of the shells, exposing the FePt grains while leaving carbon segregant material between the FePt grains. Additional Fe, Pt and C are then simultaneously deposited. The additional Fe and Pt grow on the exposed FePt grains and increase the vertical height of the grains, resulting in growth of columnar FePt grains. The additional C forms on top of the grains that together with the intergranular carbon form larger carbon shells. The resulting FePt grains thus have a generally columnar shape with perpendicular magnetic anisotropy, rather than a generally spherical shape. Lateral grain isolation is maintained by the carbon segregant remaining between the grains.

20 Claims, 8 Drawing Sheets

US 8,623,670 B1

METHOD FOR MAKING A PERPENDICULAR THERMALLY-ASSISTED RECORDING (TAR) MAGNETIC RECORDING DISK HAVING A CARBON SEGREGANT

BACKGROUND OF THE INVENTION

1. Field of the Invention

This invention relates generally to perpendicular magnetic recording media for use as thermally-assisted recording (TAR) media, and more particularly to a method for making a TAR disk wherein the magnetic recording layer includes a carbon segregant.

2. Description of the Related Art

In conventional continuous magnetic recording media, the magnetic recording layer is a continuous layer over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is thermally-assisted recording (TAR), also called heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed TAR systems, the magnetic recording material is heated to near or above its Curie temperature. The recorded data is then read back at ambient temperature by a conventional magnetoresistive read head.

One type of proposed TAR disk drive uses a "small-area" heater to directly heat just the area of the data track where data is to be written by the write head. The most common type of small-area TAR disk drive uses a laser source and an optical waveguide with a near-field transducer (NFT). A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the air-bearing surface (ABS) of the air-bearing slider that also supports the read/write head and rides or "flies" above the disk surface.

One type of proposed high-$K_u$ TAR media with perpendicular magnetic anisotropy is an alloy of FePt (or CoPt) alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy requires deposition at high temperature or subsequent high-temperature annealing to achieve the desired chemical ordering to the $L1_0$ phase, and typically include a segregant like $SiO_2$, B, BN or $SiN_x$ that forms between the FePt grains and reduces the grain size.

The use of carbon (C) has been proposed as a segregant for the FePt grains in TAR media. To obtain the required microstructure and magnetic properties, the FePt needs to be deposited with the substrate maintained at high temperatures (e.g., about 500 to 700° C.). In pending application Ser. No. 13/290, 940 filed Nov. 7, 2011 and titled "FePt—C BASED MAGNETIC RECORDING MEDIA WITH ONION-LIKE CARBON PROTECTION LAYER" assigned to the same assignee as this application, the C segregant is described as shells of multiple graphitic carbon layers that encapsulate the FePt grains, which then have a generally spherical shape.

What is needed is a method for making a FePt TAR disk with a carbon segregant wherein the FePt grains can be made thicker and thus have a more columnar and less spherical shape.

SUMMARY OF THE INVENTION

In the method of making the TAR disk according to this invention, after forming an initial layer of generally spherically shaped FePt grains encapsulated by shells of graphitic carbon layers, an etching step is performed to partially or completely remove the carbon layers on the tops of the shells. The etching may be by inductively coupled plasma (ICP) etching in a chemically reactive plasma of Ar and $H_2$ and may be performed so as to remove just the tops of the carbon shells, without removing the segregant carbon between the FePt grains. Additional Fe, Pt and C are then simultaneously deposited. The additional Fe and Pt grow on the exposed FePt grains and increase the vertical height of the grains, resulting in growth of columnar FePt grains. The additional carbon forms on top of the grains that together with the intergranular carbon form larger carbon shells. The resulting FePt grains thus have a generally columnar shape with perpendicular magnetic anisotropy, rather than a generally spherical shape. Lateral grain isolation is maintained by the carbon segregant remaining between the grains.

Alternatively, the etching may be performed so as to completely remove the carbon shells, including the carbon segregant between the FePt grains, leaving just the FePt grains. Then additional Fe and Pt grows on top of the FePt grains to form taller grains with a columnar shape and the additional carbon, co-deposited with the additional Fe and Pt, forms shells over the FePt grains and also forms as intergranular segregant material between the columnar grains.

For a fuller understanding of the nature and advantages of the present invention, reference should be made to the following detailed description taken together with the accompanying figures.

DETAILED DESCRIPTION OF THE INVENTION

Figure 1:
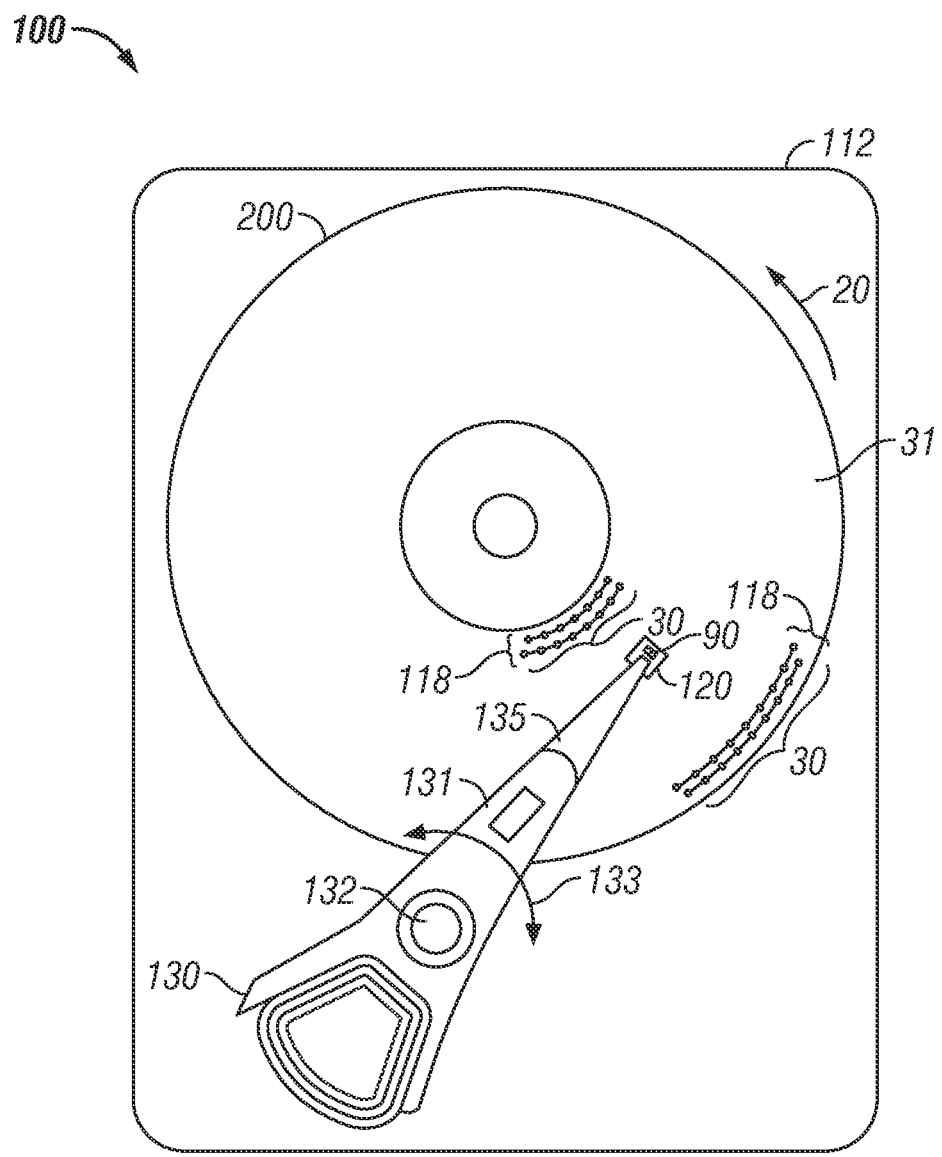
FIG. 1 is a top view of a thermally-assisted recording (TAR) disk drive according to the invention.

FIG. 1 is a top view of a thermally-assisted recording (TAR) disk drive 100 according to the invention. In FIG. 1, the TAR disk drive 100 is depicted with a disk 200 with magnetic the recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the TAR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the TAR head (not shown), which includes a magnetoresistive read head, an inductive write head, the near-field transducer (NFT) and optical waveguide. A semiconductor laser 90 with a wavelength of 780 to 980 nm may used as the TAR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the TAR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and TAR head associated with each surface of each disk.

Figure 2:
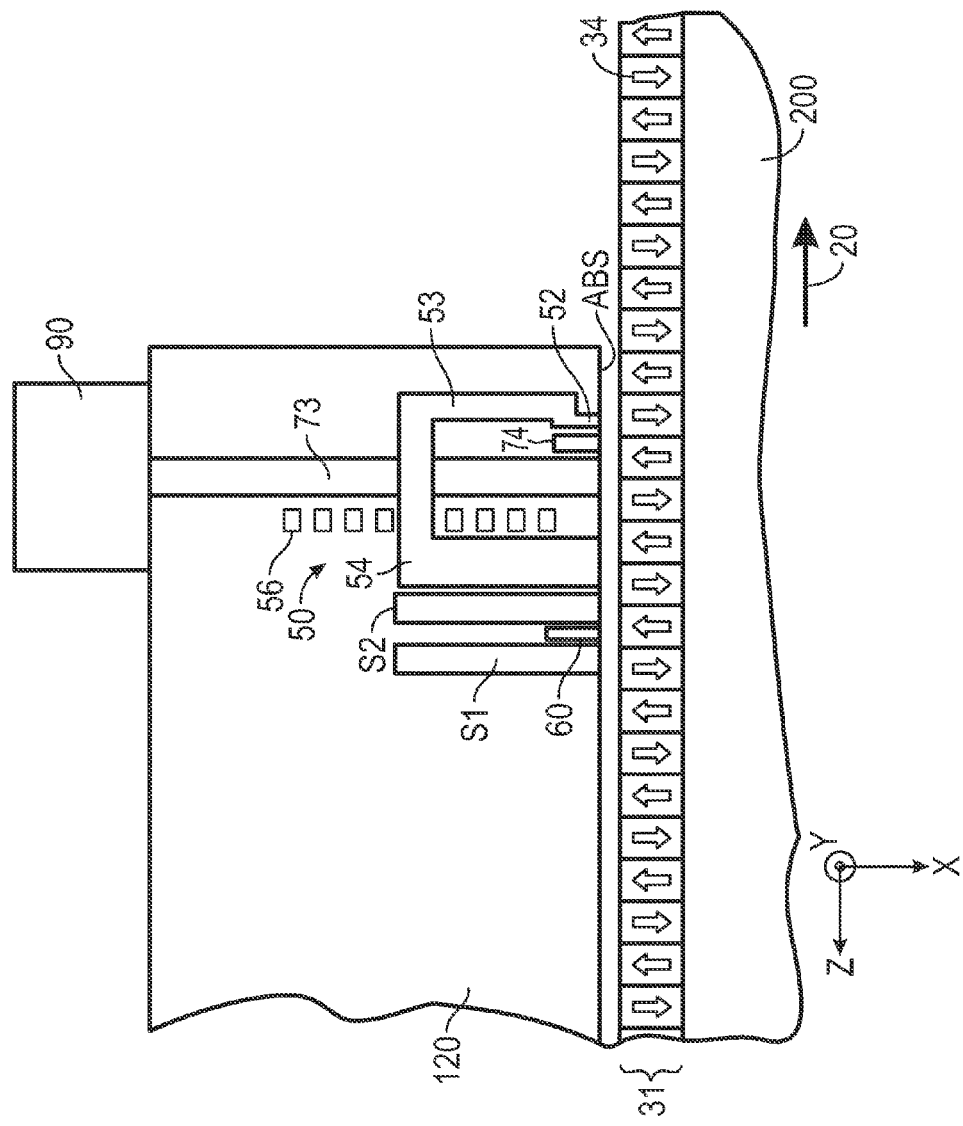
FIG. 2 depicts a sectional view, not drawn to scale because of the difficulty in showing the very small features, of an air-bearing slider for use in TAR disk drive and a portion of a TAR disk according to the invention.

FIG. 2 is a schematic cross-sectional view illustrating a configuration example of a TAR head according to the present invention. The X direction denotes a direction perpendicular to the air-bearing surface (ABS) of the slider, the Y direction denotes a track width or cross-track direction, and the Z direction denotes an along-the-track direction. In FIG. 2, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60, and magnetically permeable read head shields S1 and S2. A recording magnetic field is generated by the write head 50 made up of a coil 56, a magnetic pole 53 for transmitting flux generated by the coil 56, a main pole 52, and a return pole 54. A magnetic field generated by the coil 56 is transmitted through the magnetic pole 53 to the main pole 52 arranged in a vicinity of an optical near-field transducer (NFT) 74. At the moment of recording, the recording layer 31 of disk 200 is heated by an optical near-field generated by the NFT 74 and, at the same time, a region or "bit" 34 is magnetized and thus written onto the recording layer 31 by applying a recording magnetic field generated by the main pole 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material.

Figure 3:
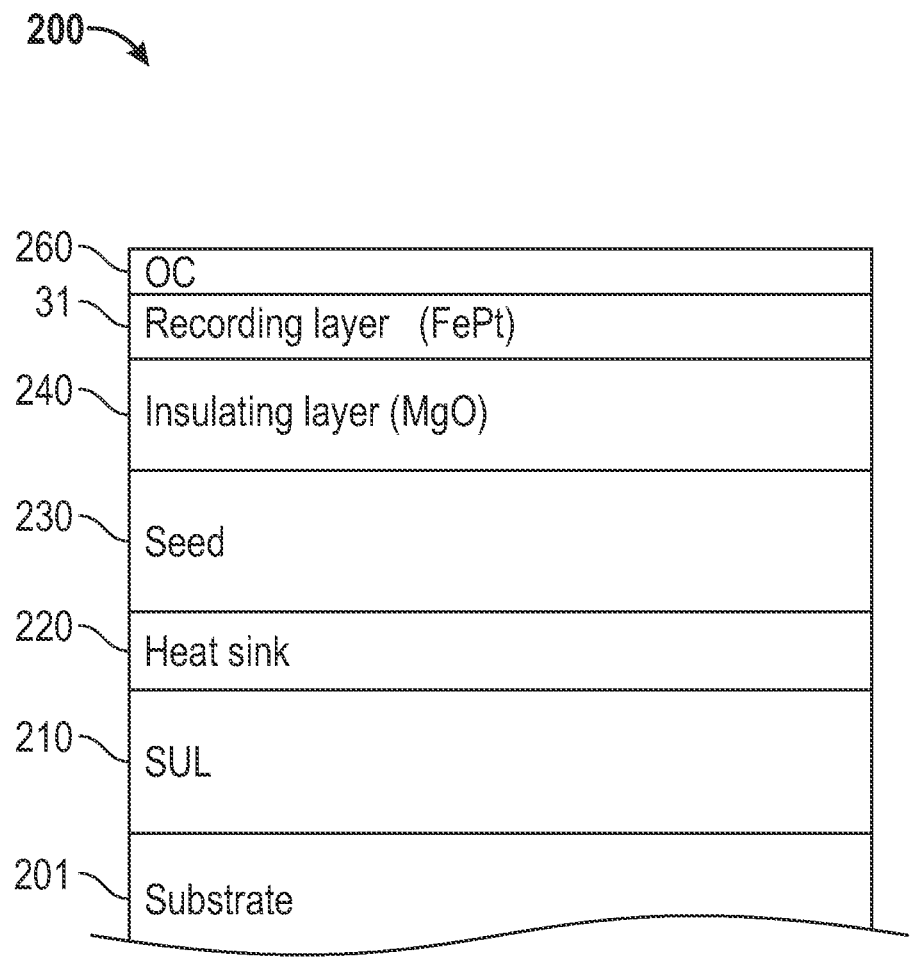
FIG. 3 is a sectional view showing a TAR disk with a FePt continuous recording layer (RL) according to the prior art.

FIG. 3 is a sectional view showing TAR disk 200 with a continuous recording layer (RL) 31 of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available glass substrate, but may also be a conventional aluminum alloy with a NiP surface coating, or an alternative substrate, such as silicon or silicon-carbide.

The perpendicular media that forms the RL 31 is a high-$H_k$ substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magneto-crystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the method will be described for media with a FePt RL, the method is also fully applicable to media with a CoPt (or a pseudo-binary CoPt—X alloy based on the CoPt $L1_0$ phase) RL.

The FePt RL is sputter deposited to a thickness of between about 4 to 15 nm while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets. As an alternative method for forming the FePt RL, sequential alternating layers of Fe and Pt can be deposited by sputter depositing from separate Fe and Pt targets, using a shutter to alternately cover the Fe and Pt targets, with each Fe and Pt layer having a thickness in the range of about 0.15 nm to 0.25 nm to the desired total thickness.

A set of underlayers are located between the substrate 201 and the FePt RL 31. An optional soft underlayer (SUL) 210 of magnetically permeable material that serves as a flux return path for the magnetic flux from the write head may be formed on substrate 201. The SUL 210 may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL 210 may also be a laminated or multilayered SUL formed of multiple soft magnetic films separated by nonmagnetic films, such as electrically conductive films of Al or CoCr. The SUL 210 may also be a laminated or multilayered SUL formed of multiple soft magnetic films separated by interlayer films that mediate an antiferromagnetic coupling, such as Ru, Ir, or Cr or alloys thereof. The SUL 210 may have a thickness in the range of about 5 to 50 nm.

An optional heat sink layer 220 may be located on substrate 201 (or on optional SUL 210) and formed of a material that is a good thermal conductor, like Cr, Cu, Au, Ag or other suitable metals or metal alloys. Heat sink layer 220 may be necessary to facilitate the transfer of heat away from the RL to prevent spreading of heat to regions of the RL adjacent to where data is desired to be written, thus preventing overwriting of data in adjacent data tracks.

An insulating layer 240, typically MgO, but also TiN or TiC, with a thickness between about 2-20 nm, is located below the FePt RL 31 to define a texture for the subsequently deposited FePt RL 31. An optional seed layer 230 for the insulating layer 240 may be used to enhance the crystalline growth of the insulating layer 240. If the insulating layer is MgO, the preferred seed layer 230 is a NiTa alloy with a thickness in the range of about 5-100 nm.

A protective overcoat (OC) 260 is deposited on the RL 31, preferably to a thickness between about 1-5 nm. OC 260 is preferably a layer of amorphous carbon, like amorphous diamond-like carbon (DLC). The amorphous carbon or DLC may also be hydrogenated and/or nitrogenated, as is well-known in the art. On the completed disk, a liquid lubricant, like a perfluorpolyether (PFPE), is coated on OC 260.

FePt $L1_0$ phase based thin films exhibit strong perpendicular anisotropy, which potentially leads to small (e.g., 3-9 nm in diameter) thermally stable grains for ultrahigh density magnetic recording. To fabricate small grain FePt $L1_0$ media some form of segregant to separate grains can be used as an integral part of the magnetic recording layer. Thus in the TAR disk 200, the RL also typically includes a segregant, such as one or more of $SiO_2$, $TiO_2$, $Ta_2O_5$, C, and BN that forms between the FePt grains and reduces the grain size. The use of carbon (C) atoms provides segregation of FePt grains that are well isolated and magnetically de-coupled for TAR media. To obtain the required microstructure and magnetic properties, the FePt needs to be deposited with the substrate maintained at high temperatures (e.g., about 500 to 700° C.). At this high temperature, the carbon segregant forms shells of multiple graphitic carbon layers that encapsulate the FePt grains. The graphitic carbon layers are sheets or partial sheets of hexagonal crystalline carbon, often of a single atomic layer like graphene, that overlap, much like an onion-skin, to form the carbon shells. This is described in pending application Ser. No. 13/290,940 filed Nov. 7, 2011 and titled "FePt—C BASED MAGNETIC RECORDING MEDIA WITH ONION-LIKE CARBON PROTECTION LAYER" assigned to the same assignee as this application. In the '940 application, the carbon that encapsulates the FePt grains also serves as the protective overcoat for the RL, eliminating the need for a separate sputter deposition step.

As part of this invention it has been discovered that while the formation of these carbon shells enhances grain isolation, it impairs the columnar growth of the FePt grains. The presence of the carbon shells drives the FePt grains toward a spherical shape. At the first stages of deposition, a shell is not fully formed and is, as a result, permeable to Fe and Pt atoms. A spherical FePt grain grows inside the carbon shell. When the multilayered shell has attained a critical thickness or structural integrity it becomes impermeable to Fe and Pt atoms, and the growth of the spherical FePt grain is stopped. From this point in media deposition onward, FePt forms new grains above the first layer. These FePt grains in the second layer will, in general, not be oriented so that the magnetic easy axis of the FePt crystal is out of the plane, and as a result will impair recording performance. For optimal recording performance in TAR media, separate control of the lateral and vertical size of the first layer of FePt grains is required. Decreasing lateral grain size is required to improve areal recording density while increasing vertical grain size is required to maintain thermal stability and magnetic signal amplitude.

In the method of this invention, after the layer of FePt—C shells is formed, an inductively coupled plasma (ICP) etching step is performed to partially or completely remove the carbon layers on the tops of the shells. The tops of the shells encapsulating the FePt grains are thus removed, allowing additional Fe and Pt atoms to be subsequently deposited to form columnar grains. Lateral grain isolation is maintained by the carbon segregant remaining between the grains.

Figure 4A:
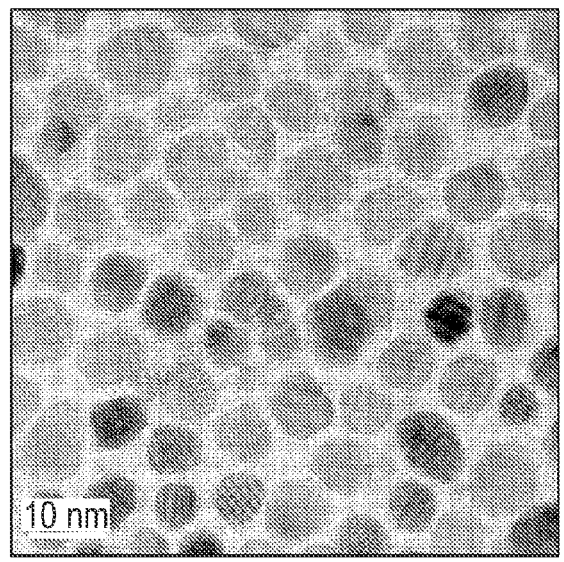
FIG. 4A is a transmission electron microscopy (TEM) image plan view of layers of FePt grains surrounded by shells of graphitic carbon layers that function as intergranular segregant.
Figure 4B:
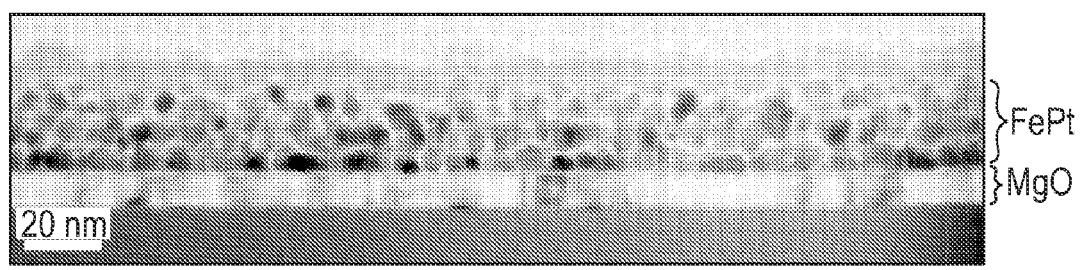
FIG. 4B is a TEM image in sectional view showing multiple of layers of FePt grains surrounded by shells of graphitic carbon layers.

Experimental evidence for the formation of onion-like graphitic carbon encapsulating FePt grains is shown by transmission electron microscopy (TEM) images in the plan view of FIG. 4A and the side sectional view of FIG. 4B. This particular FePt film was grown by magnetron sputtering co-deposition (in Ar gas at 3 mTorr) from a C target and an $Fe_{55}Pt_{45}$ alloy target (where the subscripts are in atomic percent) while the substrate was maintained at a temperature of 600° C. The substrate was a 0.8 mm thick glass substrate and an underlayer of MgO was located below the FePt film. The C added to FePt during deposition at elevated temperatures forms graphitic carbon layers that encapsulate FePt grains. They manifest themselves as the black/white curved lines in the intergranular material as can be seen in the plan view TEM image in FIG. 4A, resulting in an average spacing between the grains of about 3.5 Å. The TEM image in the sectional view of FIG. 4B shows 3-4 layers of FePt—C shells and illustrates how each layer of generally spherical shells forms on top of the layer beneath it, preventing the vertical growth of the FePt grains. Only the bottom or first layer of FePt—C shells directly in contact with the underlying MgO is useful because only it will have perpendicular magnetic anisotropy; the other layers will grow with a magnetic anisotropy pointing in random directions.

Figure 5A:
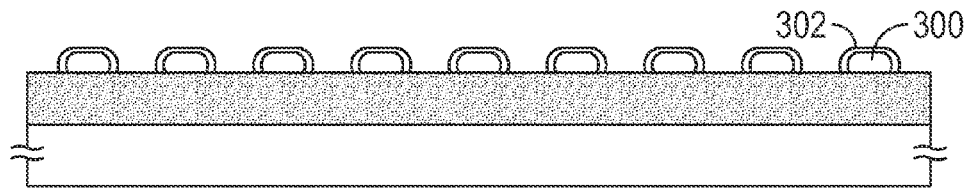
FIGS. 5A-5D are side sectional views of a graphical representation of the growth of the FePt—C shells on a TAR disk during simultaneous sputter deposition of Fe, Pt and C atoms on a heated substrate.
Figure 5B:
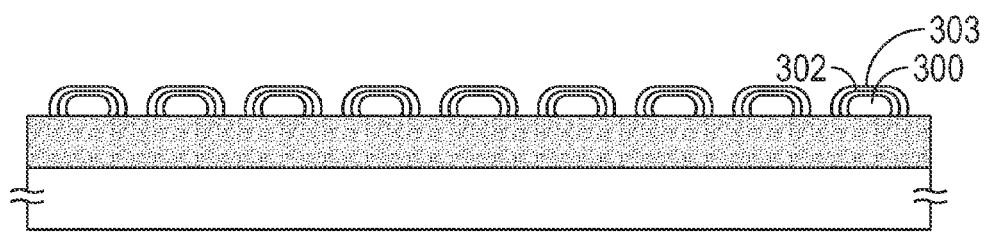
Figure 5C:
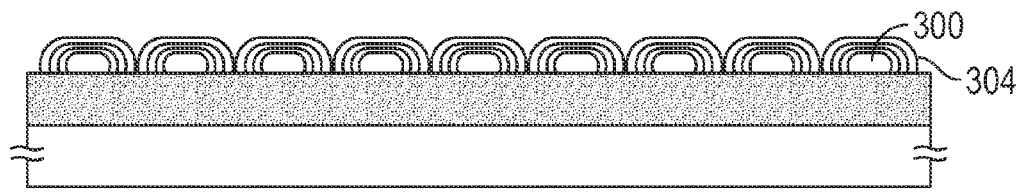
Figure 5D:
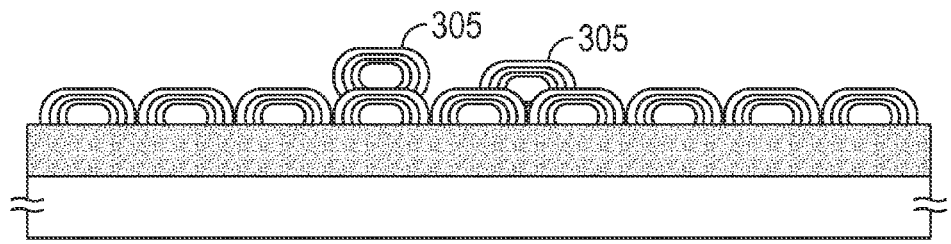

FIGS. 5A-5D are side sectional views of a graphical representation of the growth of the FePt—C shells during simultaneous sputter deposition of Fe, Pt and C atoms on a heated substrate to between 500 to 700° C. FIG. 5A shows the first stage of FePt grains 300 surrounded by initial stages of an initial carbon layer 302. The Fe and Pt atoms can diffuse through the carbon in layer 302, resulting in growth of the generally spherically shaped FePt grains 300 and the formation of additional carbon layers 303, as shown in FIG. 5B. In FIG. 5C, the carbon layers have thickened to form carbon shells 304, preventing further diffusion of Fe and Pt atoms, and thus cessation of growth of the FePt grains 300. Continued co-sputtering of Fe, Pt and C results in an additional layer of FePt—C shells 305 on top of and possibly surrounding the shells in the initial layer, as shown in FIG. 5D.

The simultaneous deposition of Fe, Pt and C on a substrate maintained at a temperature between 500 to 700° C. causes the FePt to form as the desired chemically-ordered $L1_0$-ordered phase material and also results in the formation of the carbon shells that encapsulate the FePt grains. However, it has been discovered that the carbon shells will form at a lower temperature between 350 to 500° C. Thus it is possible to form the FePt grains 300 and carbon shells 304 as shown in FIG. 5C by simultaneous deposition of Fe, Pt and C on a substrate maintained between 350 to 500° C. and thereafter annealing the deposited Fe, Pt, and carbon to a temperature between about 500 to 700° C. for between about 10 to 120 minutes.

Figure 6A:
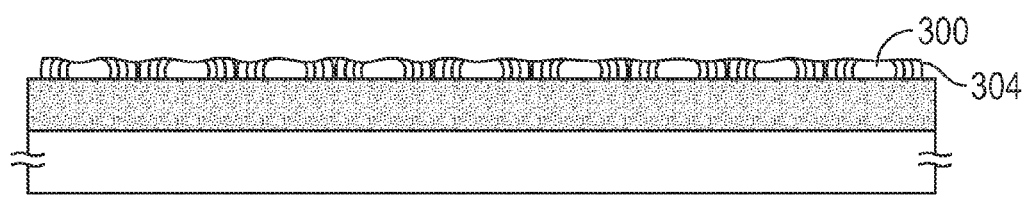
FIG. 6A is a side sectional view of the structure of FIG. 5C after the etching step according to the method of this invention.
Figure 6B:
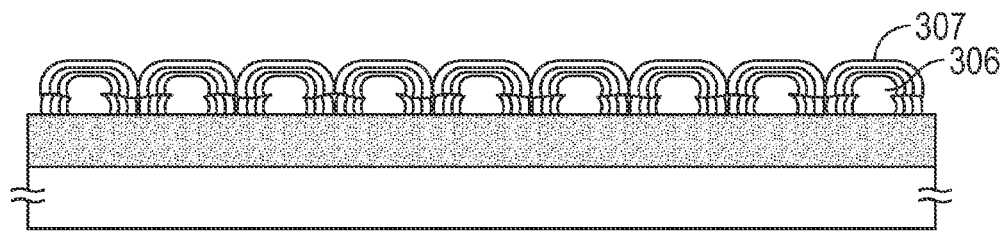
FIG. 6B is a side sectional view of the structure of FIG. 6A after additional co-sputtering of Fe, Pt and C.

FIG. 6A is a side sectional view of the structure of FIG. 5C after the ICP etching step in the method of this invention. The ICP etching is performed so as to remove just the tops of the carbon shells 304, without removing the segregant C between the FePt grains 300. The ICP etching step parameters may be determined experimentally. For carbon shells with a thickness of about 1 nm, ICP etching for 5 sec. with an Ar and $H_2$ gas mixture (30% Ar/70% $H_2$ volumetric flow rate ratio) at a total pressure of about 20 mT and at a temperature below 100° C. will remove the tops of the shells while leaving untouched most of the intergranular carbon. FIG. 6B shows the structure after additional co-sputtering of Fe, Pt and C with the substrate to between 500 to 700° C. The additional Fe and Pt grow on the FePt grains 300 and increase the vertical height of the grains, resulting in growth of columnar grains 306. The additional C forms on top of the grains 306 that together with the intergranular C form larger carbon shells 307. The resulting FePt grains 306 thus have a generally columnar shape with perpendicular magnetic anisotropy, rather than the generally spherical shape of grains 300 in FIG. 5D. With the method of this invention, the thickness of the columnar grains is between 4-10 nm, the diameter of the columnar grains is between 3-8 nm and the grains are spaced apart by the carbon segregant material by between 2-4 nm.

The simultaneous deposition of the additional Fe, Pt and C after the etching step in FIG. 6A is preferably done with the substrate maintained at a temperature between about 500 to 700° C. However, this may alternatively be done by simultaneous deposition of Fe, Pt and C on a substrate maintained between 350 to 500° C. and thereafter annealing the deposited Fe, Pt, and carbon to a temperature between about 500 to 700° C. for between about 10 to 120 minutes.

The initial FePt—C layer, i.e., the layer before the ICP etching step, as well as the subsequent FePt—C material after etching, may be formed by co-sputtering, as described for the structure shown with FePt grains in FIGS. 4A-4B. However, the FePt—C may also be formed by use of a composite FePt—C target.

Figure 7A:
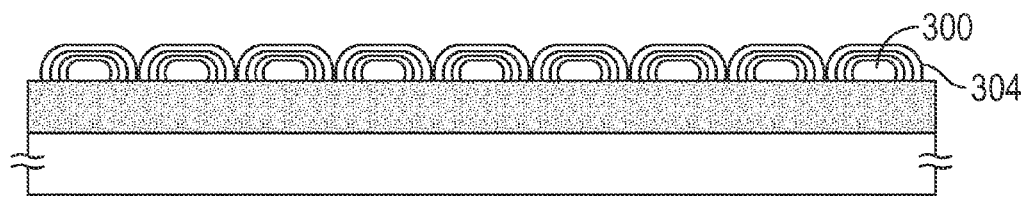
FIGS. 7A-7C are side sectional views of a TAR disk illustrating the method of this invention to completely remove the carbon shells, including the carbon segregant between the FePt grains.
Figure 7B:
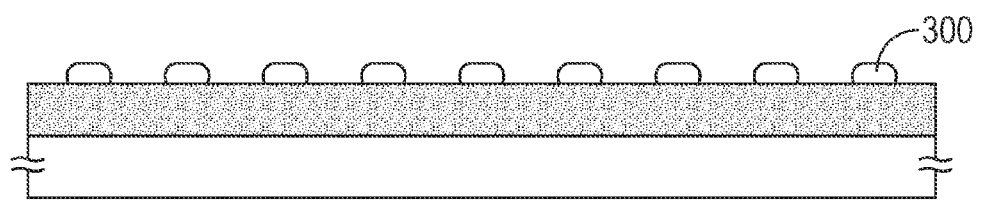
Figure 7C:
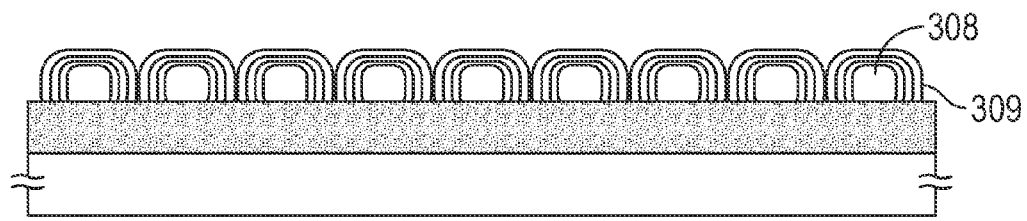

FIGS. 7A-7C are side sectional views illustrating the method of this invention for completely removing the carbon shells, including the carbon between the FePt grains. FIG. 7A shows the FePt grains 300 surrounded by carbon shells 304. In FIG. 7B, the ICP etching is performed so as to remove all of the carbon shells 304, not just the tops of the carbon shells 304 as in FIG. 6A. The ICP etching step parameters may be determined experimentally. For carbon shells with a thickness of about 1 nm, ICP etching for 20 sec. with an Ar and $H_2$ gas mixture (30% Ar/70% $H_2$ volumetric flow rate ratio) at a total pressure of about 20 mT and at a temperature below 100° C. will remove all of the carbon shells, including the intergranular carbon. While a pure Ar gas etch process would remove FePt at a rate comparable or higher than C is removed, the $H_2$-rich gas mixture removes C far more quickly than FePt. As a result, all of the C can be removed during the ICP etch step while little to no FePt is removed. FIG. 7C shows the structure after additional co-sputtering of Fe, Pt and C. The additional Fe and Pt has grown on top of the grains 300 in FIG. 7B to form taller grains 308 and the FePt grains 308 now have a columnar shape. The subsequent co-deposition of the C has formed shells 309 over the FePt grains 308 and also formed as intergranular segregant material between the grains.

In the embodiment of FIGS. 7A-7C, one or more additional segregant material may be added to the C during the subsequent deposition step of FIG. 7C. Materials such as $SiO_2$, $TiO_2$, $TaO_x$, SiC, SiN, TiC, and TiN can be co-sputtered with the C. The C should be at least 60% of the total volume of the added mixture of segregants to assure the formation of the carbon shells. For small grain size, e.g., 3-9 nm diameter grains, up to 60% by volume of the whole film is occupied by segregants.

Figure 8:
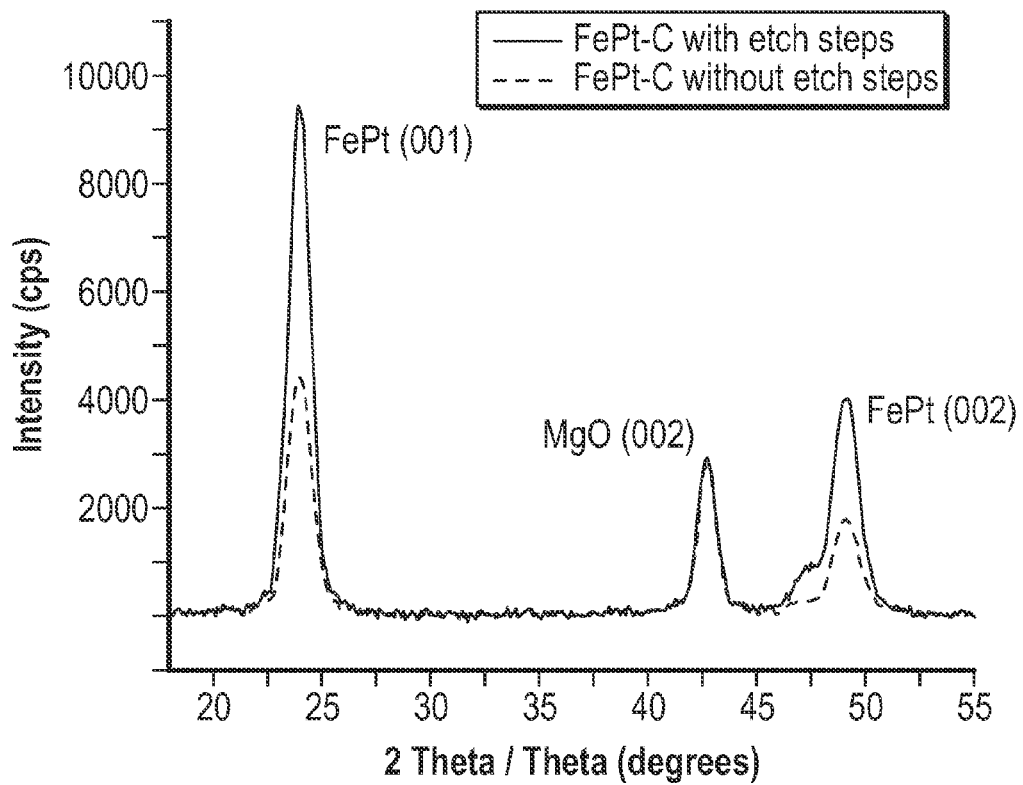
FIG. 8 is x-ray diffraction (XRD) spectra for a control sample of FePt media made without the etching steps of this invention and a test sample made with the etching steps of this invention.

To demonstrate the practicality and advantage of the method of this invention, two groups of FePt media were prepared, using identical deposition steps except for the presence or absence of the ICP etching step. In the control group, 9 nm thick FePt—C media was deposited in three steps of 3 nm each on an MgO underlayer without any ICP etching. In the test group, 9 nm thick FePt—C media was also deposited on an MgO underlayer in three steps of 3 nm each, but with an ICP etching step performed after the first and second FePt—C depositions. The FePt—C depositions were done with the substrate maintained between 550-600° C. The ICP etching steps were performed for 5 sec. with an Ar and $H_2$ gas mixture (30%/70%) at a total pressure of 20 mT and at a temperature below 100° C. The control group and the test group were then both characterized using x-ray diffraction (XRD). XRD provides an estimate of the total volume of the FePt grains with favorable crystalline alignment (i.e., $L1_0$ order with the c-axis aligned within 10 degrees of perpendicular). The XRD spectra are shown in FIG. 8. The higher intensity of the FePt diffraction peaks for the test sample (solid line) made with the ICP etching steps, as compared to the control sample (dashed line) indicates that more of the deposited FePt material (about twice as much) is found in the first layer of grains attached to the MgO. There is a balancing decrease in the amount of FePt found in grains not attached to the MgO, which because of their random crystallographic orientation do not contribute to these spectra. This increase in the FePt diffraction intensity indicates that the ICP etching steps were successful in removing the graphitic sheets on the top of the FePt and opening up the carbon shells, which would otherwise form a barrier to the continual addition of Fe and Pt atoms to the first layer of FePt grains.

Figure 9:
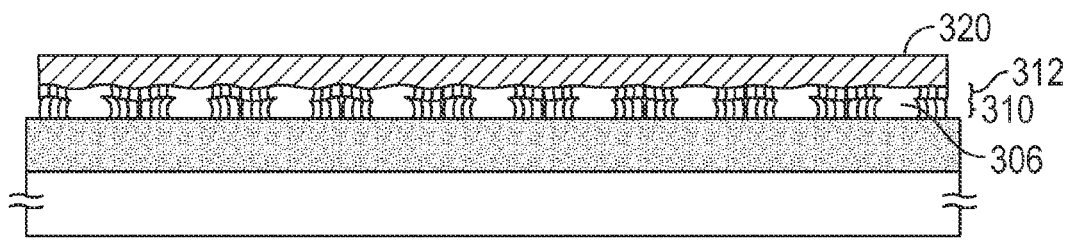
FIG. 9 is a side sectional view of a TAR disk with a first layer of FePt, a second layer formed on the first layer after the etching step to form the columnar FePt grains, and an upper exchange-coupled ferromagnetic layer formed directly on top of the columnar FePt grains.

It is also possible to use the method of this invention to form exchange-coupled media. Thus instead of depositing a final layer of FePt—C to form the columnar grains 306 surrounded by the carbon shells, as shown in FIG. 6B, a separate layer of different magnetic material can be deposited on the tops of the FePt grains from which the tops of the carbon shells have been removed by ICP etching. FIG. 9 shows a sectional view of a TAR disk with a first layer 310 of FePt, a second layer 312 formed on the first layer after the ICP etching step to form the columnar grains 306, and an upper exchange coupled ferromagnetic layer 320 formed directly on top of the columnar FePt grains 306. The use of exchange-coupled media is well-known. The ferromagnetic layer 320 may be formed of a low anisotropy magnetic material with a crystallization temperature higher than the Curie temperature of the FePt RL, such as FeCoTaB and FeCoZrB alloys. Such a layer will assist in the magnetic recording process through the exchange interaction with the FePt RL, but only when it is in direct contact with the FePt grains.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a perpendicular magnetic recording disk comprising:
    providing a substrate;
    forming on the substrate a plurality of grains of a substantially chemically-ordered alloy comprising Pt and an element selected from Fe and Co, the grains being covered by a plurality of layers of graphitic carbon;
    etching the carbon layers to expose said grains; and
    depositing Pt, said selected element and carbon simultaneously the said grains to increase the thickness of said grains, the simultaneously deposited carbon forming plurality of layers of graphitic carbon over the increased-thickness grains.

2. The method of claim 1 wherein, after exposing said grains, depositing Pt, said selected element and carbon simultaneously comprises depositing Pt, said selected element and carbon simultaneously onto a substrate maintained at a temperature between about 500 to 700° C.

3. The method of claim 1 wherein, after exposing said grains, depositing Pt, said selected element and carbon simultaneously comprises depositing Pt, said selected element and carbon simultaneously onto a substrate maintained at a temperature between about 350 to 500° C. and thereafter annealing the deposited Pt, said selected element and carbon to a temperature between about 500 to 700° C. for between about 10 to 120 minutes.

4. The method of claim 1 wherein etching comprises etching with a chemically reactive plasma of Ar and hydrogen ($H_2$).

5. The method of claim 1 wherein forming said grains covered by said carbon layers comprises depositing Pt, said selected element and carbon simultaneously onto a substrate maintained at a temperature between about 500 to 700° C.

6. The method of claim 1 wherein forming said grains covered by said carbon layers comprises depositing Pt, said selected element and carbon simultaneously onto a substrate maintained at a temperature between about 350 to 500° C. and thereafter annealing the deposited Pt, said selected element and carbon to a temperature between about 500 to 700° C. for between about 10 to 120 minutes.

7. The method of claim 1 wherein forming on the substrate a plurality of grains of a substantially chemically-ordered alloy comprises forming a substantially chemically-ordered pseudo-binary FePtX alloy in the $L1_0$ phase, where X is one or more of Ni, Au, Cu, Pd, Mn and Ag.

8. The method of claim 1 wherein forming on the substrate a plurality of grains of a substantially chemically-ordered alloy comprises forming a substantially chemically-ordered pseudo-binary CoPtX alloy in the $L1_0$ phase, where X is one or more of Ni, Au, Cu, Pd, Mn and Ag.

9. The method of claim 1 wherein said grains are also separated from one another on the substrate by a plurality of layers of graphitic carbon, and wherein etching the carbon layers comprises etching both the carbon layers covering the grains and the carbon layers separating the grains.

10. The method of claim 1 further comprising, after exposing said grains, depositing Pt, said selected element, carbon and a segregant selected from one or more of $SiO_2$, $TiO_2$, $TaO_x$, SiC, SiN, TiC, and TiN.

11. A method for making a perpendicular magnetic recording disk comprising:
    providing a substrate;
    forming on the substrate a plurality of grains of a substantially chemically-ordered alloy comprising Fe and Pt and a plurality of layers of graphitic carbon, the carbon layers generally encapsulating the FePt grains;
    etching the carbon layers in Ar and hydrogen ($H_2$) to expose the tops of said FePt grains; and
    depositing Fe, Pt and carbon simultaneously onto the exposed FePt grains to increase the thickness of said grains, the simultaneously deposited carbon forming a plurality of layers of graphitic carbon over the increased-thickness grains.

12. The method of claim 11 wherein forming said grains encapsulated by said carbon layers comprises depositing Fe, Pt and carbon simultaneously while maintaining the substrate at a temperature between 500 to 700° C.

13. The method of claim 11 wherein forming said grains encapsulated by said carbon layers comprises depositing Fe, Pt and carbon simultaneously while maintaining the substrate at a temperature between 350 to 500° C. and thereafter annealing the deposited Fe, Pt, and carbon to a temperature between about 500 to 700° C. for between about 10 to 120 minutes.

14. The method of claim 11 wherein depositing Fe, Pt and carbon simultaneously onto the exposed FePt grains to increase the thickness of said grains comprises depositing Fe, Pt and carbon simultaneously while maintaining the substrate at a temperature between 500 to 700° C.

15. The method of claim 11 wherein depositing Fe, Pt and carbon simultaneously onto the exposed FePt grains to increase the thickness of said grains comprises depositing Fe, Pt and carbon simultaneously while maintaining the substrate at a temperature between 350 to 500° C. and thereafter annealing the deposited Fe, Pt, and carbon to a temperature between about 500 to 700° C. for between about 10 to 120 minutes.

16. The method of claim 11 wherein forming a plurality of grains of a substantially chemically-ordered alloy comprising Fe and Pt comprises forming a substantially chemically-ordered pseudo-binary FePtX alloy in the $L1_0$ phase, where X is one or more of Ni, Au, Cu, Pd, Mn and Ag.

17. The method of claim 11 wherein etching the carbon layers further comprises etching the carbon between the grains to remove substantially all of the carbon.

18. The method of claim 17 wherein depositing Fe, Pt and carbon simultaneously onto the exposed FePt grains comprises depositing one or more segregant materials selected from $SiO_2$, $TiO_2$, $TaO_x$, SiC, SiN, TiC, and TiN.

19. A method for making a perpendicular magnetic recording disk comprising:

providing a substrate;

forming on the substrate a plurality of grains of a substantially chemically-ordered alloy comprising Pt and an element selected from Fe and Co, the grains being covered by a plurality of layers of graphitic carbon;

etching the carbon layers to expose said grains; and after exposing said grains, depositing Pt, said selected element, carbon and a segregant selected from one or more of $SiO_2$, $TiO_2$, $TaO_x$, SiC, SiN, TiC, and TiN onto said exposed grains.

20. A method for making a perpendicular magnetic recording disk comprising:

providing a substrate;

forming on the substrate a first layer of a plurality of grains of a substantially chemically-ordered alloy comprising Fe and Pt and a plurality of layers of graphitic carbon, the carbon layers generally encapsulating the FePt grains;

etching the carbon layers to expose the tops of said FePt grains in said first layer;

forming a second layer of FePt on said FePt grains in said first layer by depositing Fe and Pt simultaneously onto the exposed FePt grains in said first layer to thereby form increased-thickness FePt grains; and depositing a layer of ferromagnetic material directly on and in contact with said increased-thickness FePt grains, said ferromagnetic layer being exchange coupled with said increased-thickness FePt grains.

* * * * *